Figure 1:
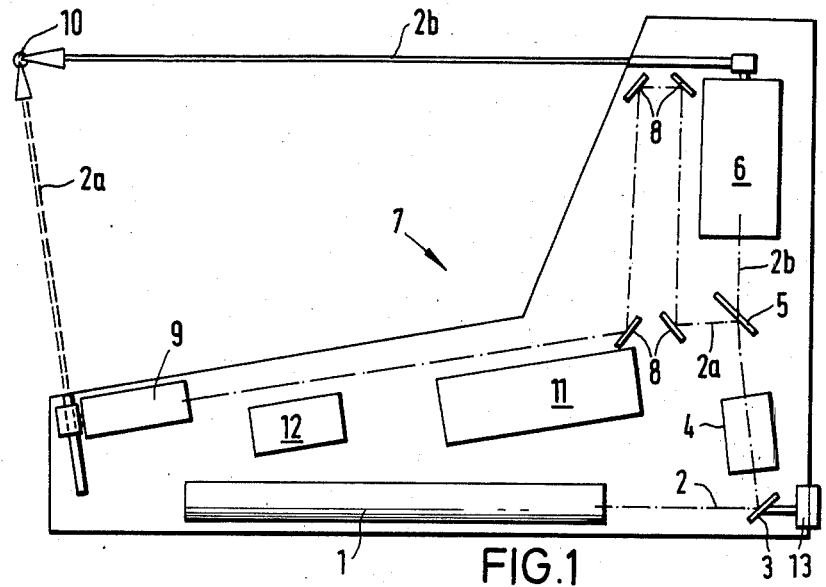

United States Patent [19]

Selbach

[11] Patent Number: 4,687,324
[45] Date of Patent: Aug. 18, 1987

[54] LASER-BASED MEASURING SYSTEM

[76] Inventor: Gerd Selbach, Taubenstrasse 18, D-4006 Erkrath 1, Fed. Rep. of Germany

[21] Appl. No.: 610,978

[22] Filed: May 16, 1984

[30] Foreign Application Priority Data

May 18, 1983 [DE] Fed. Rep. of Germany ....... 3318042
Mar. 24, 1984 [DE] Fed. Rep. of Germany ....... 3410959

[51] Int. Cl.$^4$ ...................... G01B 11/26; G01B 11/14
[52] U.S. Cl. ........................................... 356/1; 356/4; 356/376
[58] Field of Search .................. 356/1, 4, 5, 373, 375, 356/376; 73/159; 162/256, 263, 273; 250/561

[56] References Cited

U.S. PATENT DOCUMENTS

| 3,347,130 | 10/1967 | Seibel | 356/376 X |
| 3,679,307 | 7/1972 | Zoot et al. | 356/1 X |
| 4,349,277 | 9/1982 | Mundy | 356/1 X |
| 4,496,428 | 1/1985 | Wells | 356/1 X |

FOREIGN PATENT DOCUMENTS

| 3119505 | 1/1983 | Fed. Rep. of Germany . |
| 3147129 | 6/1983 | Fed. Rep. of Germany . |
| 1190564 | 5/1970 | United Kingdom . |
| 2075185 | 11/1981 | United Kingdom . |
| 2075708 | 11/1981 | United Kingdom . |

Primary Examiner—L. T. Hix
Assistant Examiner—D. Rutledge
Attorney, Agent, or Firm—Ladas & Parry

[57] ABSTRACT

A laser-based measuring system that allows precise measurement of large components for the tensioning and alignment of workpieces in a machine tool, and measurement of component vibrations. A signal generator emits two rotating laser beams which form a plane each. One beam is a measuring beam the other is a equipment zero signal. The intersection of the two beams on the workpiece is used to effect alignment. When properly aligned the two beams are superimposed and display no flickering. If not properly aligned as indicated by a coordinate monitor, the adjustment plate and fixture together with the micrometers are to adjust the plane's position.

19 Claims, 18 Drawing Figures

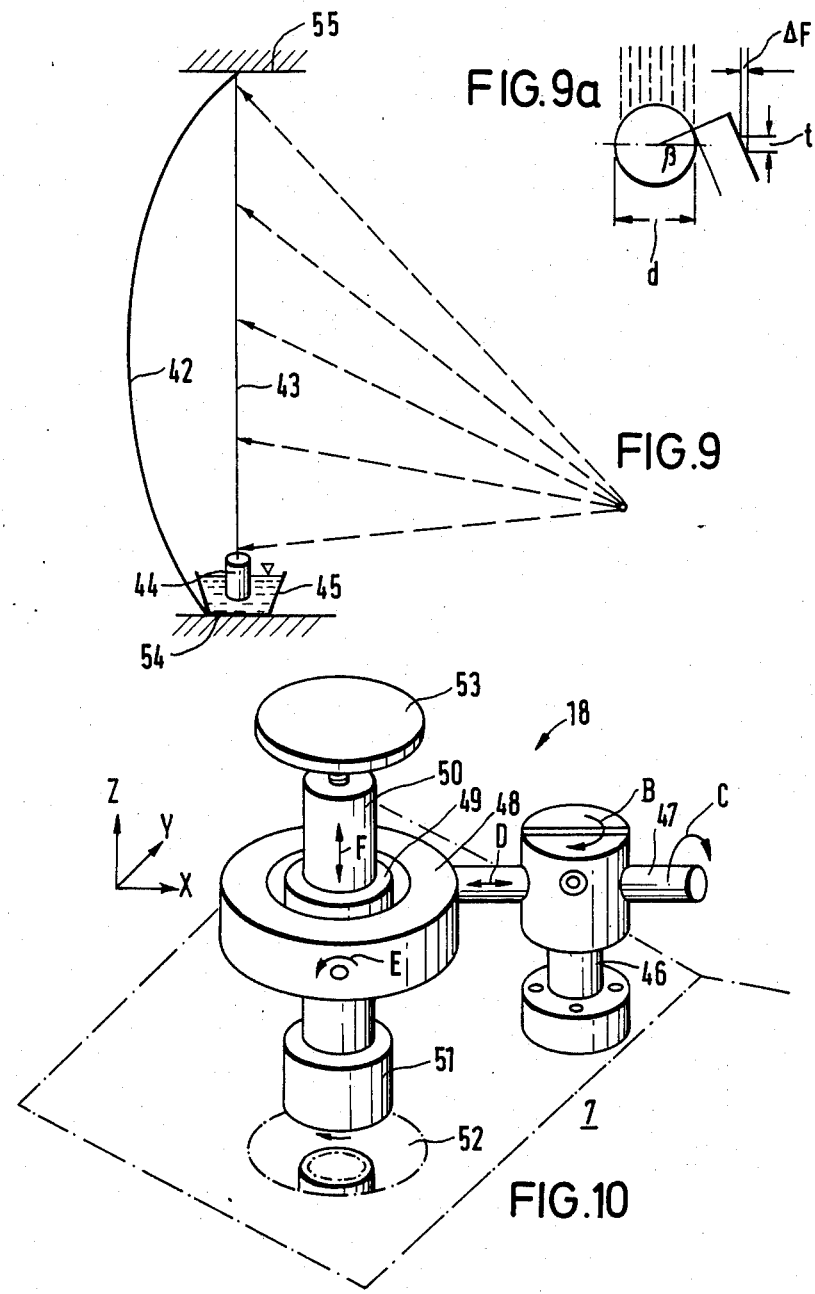

LASER-BASED MEASURING SYSTEM

The invention concerns a laser-based measuring system intended especially for measuring tensioning and alignment processes in machine tools with large tool elements and for measuring vibration in workpieces.

Laser-based measuring systems are highly effective subject to laboratory conditions because of the interferometry and linearity of their beam propagation. The systems are, on the other hand, often difficult to use outside the laboratory because of the sensitivity of the laser beam to external conditions like humidity, temperature, and turbulence, which reinforce such internal factors as the heat expansion of the mirror system and laser tube and imprecise deflector mounting. The high initial precision of the laser beam can be distorted to an extent that renders it useless.

Furthermore, the problem of not knowing the system zero at the instant of measurement has not yet been resolved to the satisfaction of the worker in a work shop. Underlying any determination of precise results is an assumption that the zero is actually present at the instant of measurement. This, however, is never certain, since even turbulence alone can cause distrotions.

Although interfeometric measurements are used in conventional shop practice, they are not practicable for many shop applications. In addition to their considerable costs, the precision of measurement is such that irregularities of the surface of most work pieces causes problems. It is, however, precisely in the work shop where it is necessary to align large machines and heavy work pieces where the need for such methods exists.

Furthermore, the known measuring systems do no allow the measurement of the deformation of components subject to vibration, a task that is often necessary for long waveguides and for the housings of large machinery.

The object of the present invention is to provide a laser-based measuring system that allows precise measurement of large components, for the tensioning and alignment of workpieces in machine tools for example, as well as the measurement of component vibrations, and that is easy to set.

This object is attained in accordance with the invention in that the laser-based measuring system consists of a laser-based measuring device, of a coordinate monitor, of a calibration reference, of a measurement bed, and of a deflection setting.

All of these elements with the exception of the calibration reference are located on a common carriage in such a way that the laser-based measuring device can be employed already set and ready to operate at any work station in conjunction with one or more coordinate monitors that are stationary in relation to the work station.

When the laser-based measuring device is on, it emits two laser beams, one representing the measuring signal and the other the equipment-zero signal and both generated from one ray path. A fixed relation is accordingly maintained between the measuring signal and the equipment-zero signal, and any external factors like humidity, temperature, or turbulence will displace both signals to the same extent, canceling out the deviations as measurement errors.

Provision is made for the equipment-zero signal to strike the site of measurement at a right angle and for the measurement signal to strike it at an acute angle. Angles of 80° to the vertical, the angle of incidence of the equipment-zero signal, will accordingly result in a six-fold displacement toward the equipment-zero signal per unit of vertical displacement.

Ease of measurement-signal reading, which is so important for shop applications, is ensured either by a very short distance between the traces of the measurement and equipment-zero signals or by low-frequency modulation of the measurement signal in relation to the equipment-zero signal. The Gaussian limit of the laser beam can simultaneously be unilaterally eliminated by appropriate design of the deflector in the laser-based measuring device. When the measurement signal is modulated and the equipment-zero ignal unmodulated, the deflector is set in a practical way such that the width of the measurement signal only slightly exceeds that of the equipment-zero signal.

The equipment zero signal and the measurement signal are set to intersect at the point of alignment so that when the equipment is properly aligned, the two signals show as a single line on the workpiece.

Displacements in the midlines of the measurement signal and equipment-zero signal will accordingly lead to easily recognized flickering of the boundary between the superimposed signal traces at whatever side the displacement occurs toward. A measurement precision of 0.005 mm can be attained thereby even with the naked eye and at a visual acuity of only 30%. Employing complementary colors can further increase resolution for the human eye.

Spreading the equipment-zero signal and measurement signal stroboscopically over the surface of the article to be measured permits measurements of vibration to be obtained as well In one particular embodiment of the invention the laser beams can be variably focused. If the focusing device in the laser-based measuring device is activated in a beam path that is common to the measurement signal and the equipment-zero signal during measurement and the focusing distance accordingly modified, measurement ranges of several meters can be comprehended at constant precision. There is no physical limit for the range of measurement. It depends strictly on the optical elements in the system. The laser-based measuring device accordingly allows precise measurement of lengthy and vibrating components.

The position of the measurement signal and equipment-zero signal in relation to the plane of operation and hence to the geometry of the machine tool is monitored on-line by focusing the measurement signal very precisely at a particular point on the machine guide. The high speeds that the angle of the measurement signal in the vicinity of this point can be changed at narrow the trace of the measurement signal on the machine-tool guide to an extent unattainable by optical means. The median and immediate environment of the energy normally distributed in the focus is exploited as a reference signal. The width of focus simultaneously decreases about one power of ten at the particular point.

The device accordingly allows workpieces to be aligned so precisely in machine tools that the surface to be worked and the direction in which the tool is moving can be directly coupled by means of a laser signal. The superimposition of measurement signal and equipment-zero signal allows machine-integrated application during processing and hence the control of the motions and their precision.

The particular location of the machine-tool guide is represented for the laser-based measuring device by the coordinate monitor, which obtains and displays all the disruptive factors deriving from machine design and from the environment.

The coordinate monitor in accordance with the invention consists of a piece that rotates around the axis of the incident laser beam and has two electro-optical sensors that control two measuring instruments through an amplifier. These sensors are positioned on the midline of the rotating piece at an equal distance from the midpoint of the rotating piece. The rotating apparatus can be displaced laterally to the plane of the incident laser beam. The incident energy can be distributed by means of rotation and lateral displacement until the downstream measuring instruments indicate coincidence when the currents generated by the incident light are equal. Coincidence of the measuring instruments determines the point at which measurement commences. If a deviation in this position that is only possible laterally occurs, one of the sensors will be irradiated more powerfully and the other more weakly. Corresponding to this is a display in the opposite sense on the part of the measuring instruments. If the coordinate monitor is set to the threshold of high sensitivity at the point that measurement commences at, even very slight deviations will be be displayed. The combination of rotary and lateral motion at the threshold of high sensitivity leads to a sensor and laser beam of finite extent behaving like those of infinitesimal extent.

The very low irradiation intensities involved, fractions of the laser beam and sensor surface, demand the exclusion of foreign radiation and daylight. A third sensor, that is wired along with the other sensors to a differential amplifier is employed for this purpose.

In addition to the display of results on a conveniently located display it is also possible to represent them on an oscillograph. The effects of collective disruptive parameters are accordingly visible and exploitable, especially with the correlation of several axes of the laser-based measuring device allowing it to be employed over long measurement distances.

It is practical for the coordinate monitor to have its own current supply. This enables measurements to be taken far remote from the generator, the laser-based measuring device that is, under normal conditions.

When the laser-based measuring device is being set, it rests in a defined position on the measurement bed. The measurement bed on the other hand is aligned in relation to the coordinate monitor during the setting process. The measurement bed has a base plate with three setscrews in the form of a triangle with spring-loaded tensioning elements on the lines of application of the tensioning triangle mounted on a rail. Turning the setscrews generates a motion along one of the three three-dimensional coordinates and/or a motion around the two other coordinate directions.

It is practical for the rail to be a T rail with a Morse-taper adaptor that can be introduced into tensioned T grooves. Two other setscrews should be mounted on the base plate in contact with the rail and perpendicular to the length of the rail and the first setscrews. These setscrews can generate a motion around the aforesaid spatial axes. The first three setscrews and the two other setscrews can correct any deviation because corrections toward the two latter spatial axes irrelevant.

The T rail should be tensioned in the tensioned T groove by means of spring-loaded balls that are positioned between the rail and the groove with their convexities penetrating the flange and web of the rail where they intersect. This system tensions the parts automatically.

A prerequisite for precise measurement with the laser-based measuring device is that the surface constituted by the rotating laser beam be absolutely plane. The planarity of the plane of light defined by the deflected laser beam depends on the precision of one unit of deflection. At high precision, which is to be considered situated in the $10^{-3}$ range, no appropriate reference segments, which should have a length in the meter range, are available. The calibration reference in accordance with the invention is accordingly an independent weighted wire with a diameter $d \geq F/\cos \beta$, where $\beta = 10\text{-}15°$ and with liquid-damped vibration. At this diameter, deviations $\Delta F$ are amplified by cotangent $\beta$ in the spatial depth t of the diameter of the wire.

The laser-based measuring system, finally, has a deflection setting that displaces the deflector in the laser-based measuring device until the calibration reference is completely covered.

Adjustment of the deflectors, which have a rotating or oscillating mirror as their major component, must generally allow the border between two generating lines, each of which describes a mutually inverted cone, to be discovered, with the generating lines represented by a laser beam. The axes of the deflectors in the laser-based measuring device in accordance with the invention are related, because of the spatial extension of the device, by three-dimensional coordinates that are not always unambiguously defined. The problem of mirror displacement while the deflectors are in motion is resolved in a practical way by providing the deflector setting with a point of rotation that is stationary in relation to the device and constitutes the zero point for a translation along two axes and for a rotation around three axes. The deflector setting and the rotating mirror support in the deflector should be synchronized by a frictional coupling.

Further characteristics of the invention can be found in the description of the figures and in the subsidiary claims, whereby it is to be noted that all characteristics individually and in combination are further developments of the invention.

The figures illustrate one embodiment of the invention without restricting it to that embodiment.

Figure 1A:
Figure 1B:
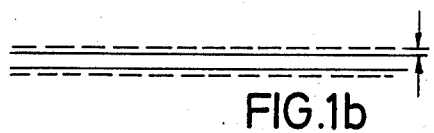
Figure 1C:
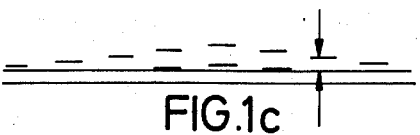
Figure 2:
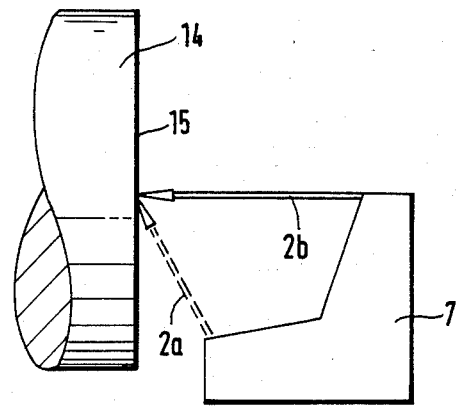
Figure 3:
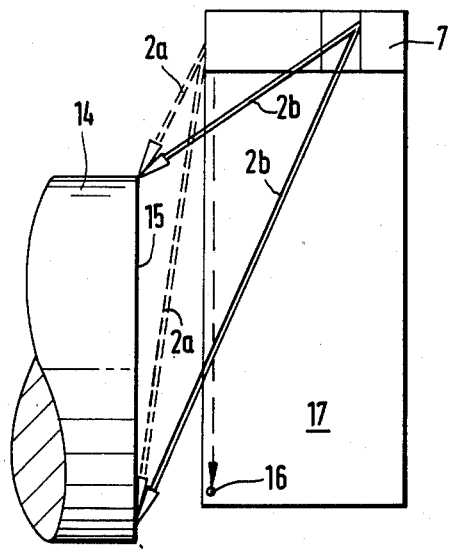
Figure 4:
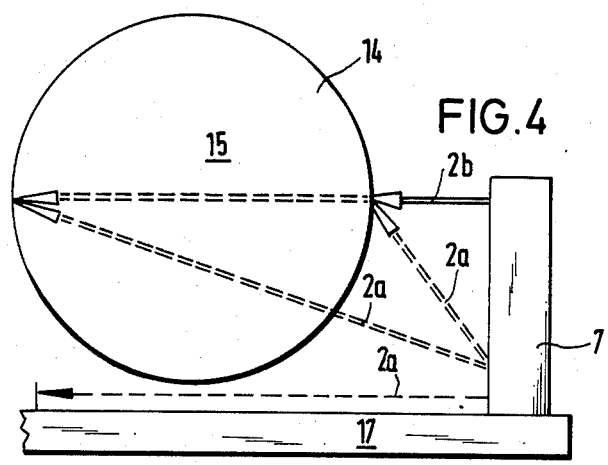
Figure 4A:
Figure 4B:
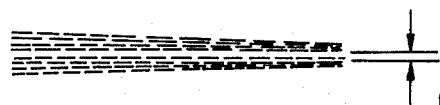
Figure 4C:
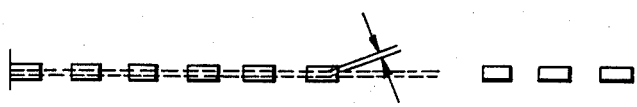
Figure 5:
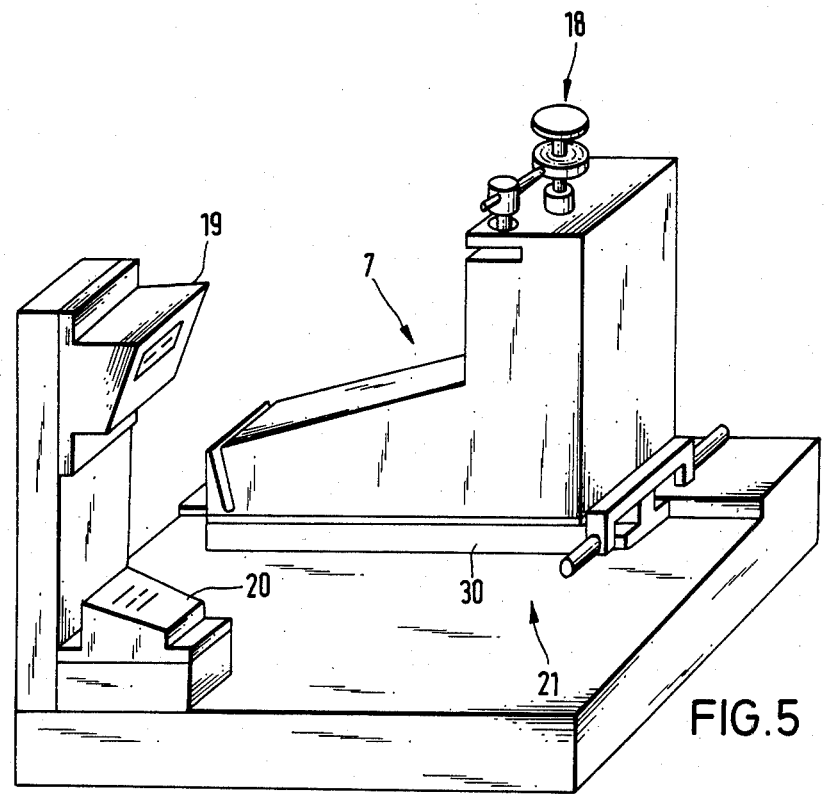
Figure 6:
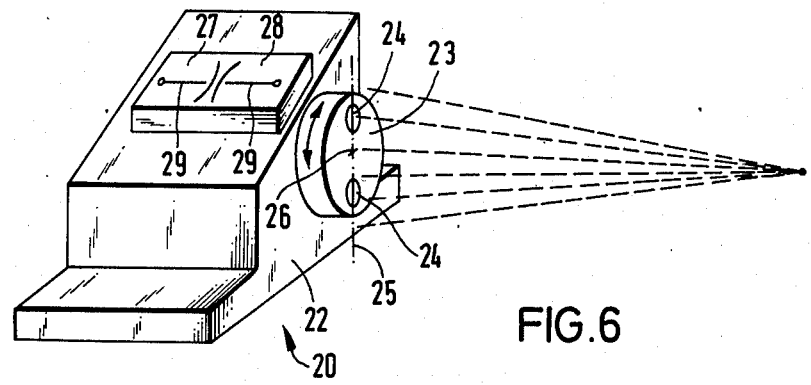
Figure 7:
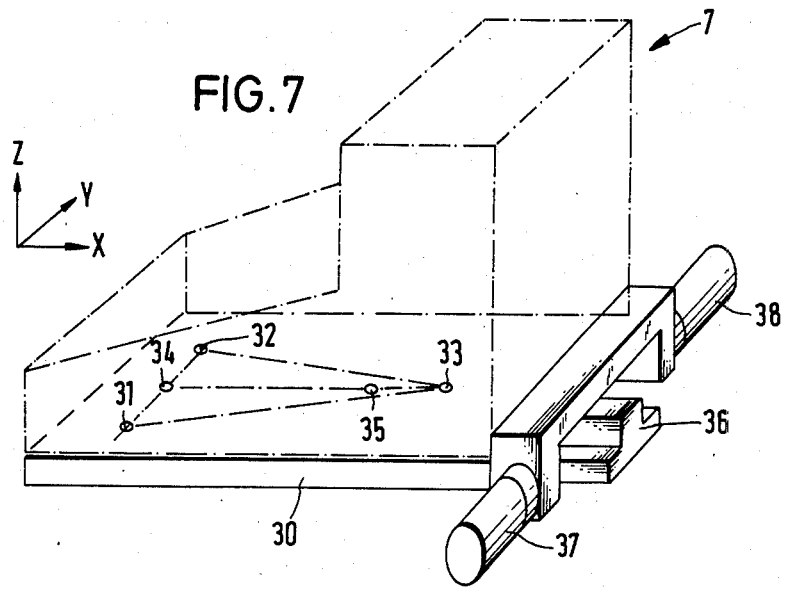
Figure 8:
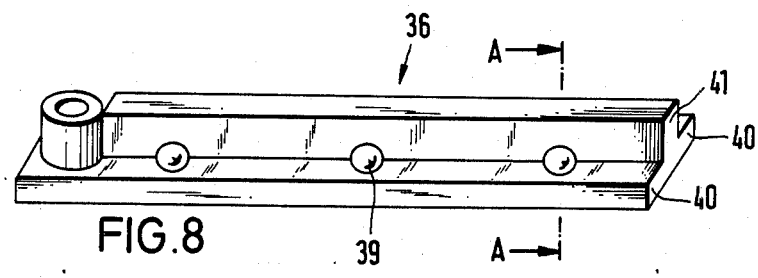
Figure 8A:
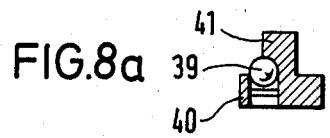

FIG. 1 is a side view of the laser-based measuring device with the beam path within the device illustrated schematically, FIGS. 1a, 1b, and 1c illustrate various forms of laser beams that can be generated, FIG. 2 illustrates the device as illustrated in FIG. 1 and with the beams focused on a workpiece, FIG. 3 is a top view of the laser-based measuring device and of a machine tool with the beams focused on a workpiece, FIG. 4 is a view along the workpiece with the beams emerging from the device, FIGS. 4a, 4b, and 4c illustrate various beam forms on workpieces, FIG. 5 is a three-dimensional overall view of the laser-based measuring device, deflector setting, coordinate monitor, and measurement bed, FIG. 6 is a three-dimensional detail view of a coordinate monitor, FIG. 7 is a three-dimensional detail view of a base plate positioned on the measurement bed with mechanisms for setting the base plate along a rail, FIG. 8 is a three-dimensional view of the rail illustrated in FIG. 7, FIG. 8a is a section through the rail along the line A—A in FIG. 8, FIG. 9 is a schematic illustration of the calibration reference, FIG. 9a is a detail view of the wire illustrated in FIG. 9 irradiated by a laser beam, and FIG. 10 is a three-dimensional view of the deflector setting.

FIG. 1 is a schematic illustration of the device. Laser-based measuring device 7 has a laser tube 1 inside it. The laser beam 2 emitted from laser tube 1 strikes a mirror and is reflected toward a beam spreader 4. The spread beam arrives at a beam splitter 5. One beam component 2a of laser beam 2 is reflected by beam splitter 5 and the other beam component 2b passes through it. Beam component 2a in this case represents a measurement signal and beam component 2b a equipment-zero signal. The equipment-zero signal is supplied to a deflector 6 and leaves laser-based measuring device 7 in the direction of a vertical plane. Beam component 2a is, subsequent to being reflected at beam splitter 5, reflected by four other mirrors 8 and likewise supplied to a deflector 9. Beam component 2a leaves deflector 9 at an angle of about 80° to the vertical. The line of intersection of beam component 2a, the measurement signal, and of beam component 2b, the equipment-zero signal, extends perpendicular to the plane of projection through a point 10.

Inside laser-based measuring device 7 there are also a power source 11 and a modulator 12, which are illustrated only schematically. Laser-based measuring device 7 also has a connection 13 for accommodating larger beam spreaders and reticule modules. These accessories make it possible to employ the device as a construction laser for surface and section leveling.

The measurement signal, which strikes the site of measurement, a workpiece for example, at an acute angle, is superimposed on the equipment-zero signal, which strikes it at a right angle. An angle of about 80° to the vertical, which is the angle of incidence of the equipment-zero signal, will result in a sixfold displacement with respect to the equipment-zero signal per unit of vertical displacement. Workpieces can be aligned in machine tools with essentially higher precision than heretofore.

The easy readability of the measurement signal is further ensured by a very short distance between the traces of the measurement signal and of the equipment-zero signal or by low-frequency modulation or the measurement signal in relation to the equipment-zero signal. FIGS. 1a through 1c illustrate various forms of intersection traces on workpiece surfaces. FIG. 1a illustrates a unilaterally linearized laser beam, FIG. 1b the modulated measurement signal superimposed over the unmodulated equipment-zero signal, and FIG. 1c the overlap in FIG. 1b with the workpiece vibrating. The distances between the traces of the measurement and equipment-zero signals is represented by the intervals between arrows in FIGS. 1a through 1c.

FIGS. 2, 3, and 4 are different views of the laser-based measuring device with a workpiece. FIG. 2 corresponds to FIG. 1 but with the workpiece 14 indicated. FIGS. 3 and 4 illustrate the path of beam components 2a and 2b over the surface of the workpiece. FIGS. 4a, 4b, and 4c illustrate the intersection traces on the surface of the workpiece. FIG. 4a illustrates a Gaussian-limited laser beam, FIG. 4b a unilaterally linearized laser beam as in FIG. 1a with the measurement distance indicated between the arrows, and FIG. 4c the modulated and unmodulated signals overlapping as in FIG. 1b with the measurement distance also indicated between the arrows. As will be especially evident from FIGS. 4 and 4c, the intersection traces of components 2a and 2b overlap on the surface 15 of workpiece 14 in the zero position, whereby every rotation around the upper axis of the device would generate an opening quadrant in the intersection traces that would, depending directly on the angle of rotation, allow precise angular measurements with respect to the zero position.

The position of the measurement signal represented by beam component 2a and of the equipment-zero signal represented by beam component 2b in relation to the plane of operation and hence to the geometry of the machine tool is monitored on-line by focusing the measurement signal very precisely at a point 16 on the machine guide. A coordinate monitor, which will be described in greater detail hereinafter, is located at point 16. The high speeds that the angle of beam component 2a in the vicinity of point 16 can be changed at narrow the trace of the measurement signal on machine-tool guide 17 to an extent unattainable by optical means. As a result of these properties, laser-based measuring device 7 allows workpiece 14 to be aligned very precisely with respect to workpiece guide 17 because the surface to be worked and the direction in which the tool is moving can be directly coupled by means of beam component 2a.

Results can be read by the human eye and simultaneously by electro-optical means. Accessories allow line and surface leveling.

FIG. 5 is a three-dimensional overall view of laser-based measuring device 7, deflector setting 18, coordinate monitors 19 and 20, and measurement bed 21. All the elements are located on the same carriage in such a way that the laser-based measuring device can be employed already set and ready to operate at any work station in conjunction with one or more coordinate monitors that are stationary in relation to the work station.

The method of setting laser-based measuring device 7 will now be described with reference to FIGS. 5 through 10.

FIG. 6 is a three-dimensional view of a coordinate monitor of the type illustrated in FIG. 5 or positioned at point 16 in FIG. 3. Coordinate monitor 20 consists of a housing 22 with a piece 23 that can be rotated around the axis of a laser beam, not illustrated, mounted on one side. Rotating piece 23 has two electro-optical sensors 24 positioned on the midline of rotating piece 23 at an equal distance from the midpoint 26 of the piece. Sensors 24 control two measuring instruments 27 and 28 through an amplifier, not illustrated.

The laser beams emitted from laser-based measuring device 7 sweep over sensors 24, which are initially located in the center, as deflectors 6 or 9 rotate. Because the width of the sensors is finite, the energy distribution in each light-conducting channel associated with the sensors is indeterminate in this state. The rotation of piece 23 while coordinate monitor 20 is simultaneously laterally displaced results in a state that causes the indicators 29 of measuring instruments 27 and 28 to overlap.

Deviations of the laser beam from this setting will then lead to direct display by measuring instruments 27 and 28 and the deviations can be corrected. Measurements can be undertaken with the laser-based measuring device while the indicators 29 of measuring instruments 27 and 28 overlap. Coordinate monitors that are stationary in relation to the work station accordingly allow the immediate utilization of the device when it indicates overlap of indicators 29 on the carriage FIG. 5 illustrates in conjunction with FIG. 7 the position of laser-based measuring device 7 on measurement bed 21 and the means of setting base plate 30, which is positioned on measurement bed 21. Coordinates x, y, and z are also illustrated in FIG. 7 for purposes of clarity. Base plate 30 accommodates laser-based measuring device 7 in a defined position on its upper surface. Base plate 30 is provided with three setscrews 31, 32, and 33 in the form of a triangle with spring-loaded tensioning elements 34 and 35 on the lines of application of the tensioning triangle. Base plate 30 is positioned on a T rail 36. Perpendicular to the length of T rail 36 and to setscrews 31, 32, and 33, two other setscrews 37 and 38 that come into contact with T rail 36 are mounted on base plate 30.

All of the disruptive parameters deriving from the design of the device and from external factors are detected and displayed by coordinate monitors 19 or 20 and can be corrected by adjusting setscrews 31, 32, and 33 or 37 and 38. Corrections along the z and/or the x and y axes are made by turning setscrews 31, 32, and 33, whereas activating setscrews 37 and 38 will displace base plate 30 along the z axis. Thus, any deviation can be corrected, given that corrections along the x or y axes are always irrelevant.

FIG. 8 is a three-dimensional view of the T rail 36 illustrated in FIG. 7. T rail 36 has a Morse-taper adaptor and can be introduced into a tensioning T groove, not illustrated, and the T rail is tensioned in the tensioned T groove by means of spring-loaded balls 39 with their convexities penetrating the flange 40 and web 41 of the rail where they intersect. T rail 36 will accordingly tension itself automatically into any T groove as the result of the action of spring-loaded balls 39.

FIG. 9 is a schematic illustration of a calibration reference and of the ceiling 55 and floor 54 of a room. A tensioning strip 42 is tensioned between floor 54 and ceiling 55. A wire 43 with a weight 44 at the bottom is fastened to the upper end of tensioning strip 42. The weight is immersed in a liquid-filled tank 45. Wire 43 accordingly represents an ideal straight line for setting the planarity of the surface, not illustrated, constituted by the rotating laser beam. Tensioning strip 42 makes it possible to position a suspended and weighted wire 43 of any length at any point in the room with liquid-damped vibration. FIG. 9a is a detail view of wire 43. The wire has a diameter d=F/cos 10°, where F is the focal diameter of the laser beam. FIG. 9a illustrates in particular that the diameter of the wire is slightly shorter than that of the wire. With a wire of this diameter, deviations $\Delta F$ decay into the spatial depth t of the wire diameter at cotangent $\beta$. A $\Delta F$ of 0.01 mm is represented in the depth as about 0.05 mm, twice as much as would be perceptible to the naked eye. A 10-magnification loup will accordingly allow calibration in relation to the straight line at a ten times greater precision. The calibration reference accordingly makes it possible to determine precisely the planarity of the light plane defined by the deflected laser beam. Reference sections in the meter range are no longer necessary.

FIG. 10 illustrates deflector setting 18 in detail. The deflector setting is employed to adjust the rotating or oscillating mirror in laser-based measuring device 7. The inclination of the mirror in the deflector is varied until the calibration reference is covered to its full extent, meaning that the planarity of the laser beam is given.

Adjustment of deflectors 6 or 9, which have a rotating or oscillating mirror as their major component, must allow the boundaries between two generating lines, each of which describes a mutually inverted cone, to be discovered, with the generating lines represented by a laser beam.

The axes of deflectors 6 or 9 are related, because of the spatial extension of the device, by three-dimensional coordinates that are not always unambiguously defined. In order to position the axes of the deflectors in a mutually unambiguous definite relation to each other, deflector setting 18 has a point 46 of rotation that is stationary in relation to the device and constitutes the zero point for a translation along two axes and for a rotation around three axes. Deflector setting 18 has a shaft 47 that can be rotated in the direction indicated by arrow B around the point 46 of rotation in laser-based measuring device 7 that is stationary in relation to it. Shaft 47 can also be rotated in the direction indicated by arrow C around its own axis and displaced longitudinally in the direction indicated by arrow D. One end 48 of shaft 47 has a uniaxial, gimbal-mounted (arrow E) clamp 49, which guides in the direction indicated by arrow F a hollow shaft 50. Shaft 50 has a synchronized carrier 51 for the mirror support 52 of a deflector at the end toward the device and a setscrew 53 for setting the angle of mirror inclination at the other end.

Deflector setting 18 accordingly makes it possible to carry out translations along two axes and a rotation around three axes. Synchronization of deflector setting 18 and rotating deflector mirror support 52 is ensured by an 0 ring, not illustrated, in a rotating hollow shaft that functions as a frictional coupling. Once synchronization is attained, a threaded spindle in hollow shaft 50 establishes the mirror inclination.

I claim:

1. A laser-based measuring system intended especially for measuring, tensioning or alignment procedures in machine tools with large workpieces and for measuring vibration in components which comprises a laser beam generating device, means to split a laser beam so produced so as to create a measuring signal and an equipment zero signal, deflectors positioned in each of the measurement beam path and the equipment zero laser path to deflect each laser beam into and rotate or oscillate each beam through a plane so that the measurement signal and the equipment zero signal may impinge upon a workpiece in planes set at different angles to its surface, one or more coordinate monitors to detect disruptive factors deriving from machine design or the environment, means for defining precisely the planarity of the light beam defined by the deflected laser beam and means for correcting the planarity thereof in case of disruption.

2. Laser-based measuring system as in claim 1, characterized in that the laser-based measuring device, the coordinate monitor, the measurement bed, and the deflection setting are located on a common carriage.

3. Laser-based measuring system as in claim 1, characterized in that the equipment-zero signal strikes the site of measurement at a right angle and the measurement signal to strike it at an acute angle.

4. Laser-based measuring system as claimed in calim 1, wherein the measuring signal is a modulated signal and the equipment zero signal is an unmodulated signal.

5. Laser-based measuring system as claimed in claim 1 wherein the measuring signal and the equipment zero signal can be variably focussed.

6. Laser-based measuring system as claimed in claim 1 wherein the measuring signal and the equipment zero signal have complementary colors.

7. Laser-based measuring system as claimed in claim 1 wherein the signals are spread stroboscopically.

8. Laser-based measuring system as claimed in claim 1 wherein the coordinate monitor consists of a piece that rotates around the axis of the incident laser beam and has two electro-optical sensors that control two measuring instruments through an amplifier.

9. Laser-based measuring system as in claim 8, characterized in that the sensors (24) are positioned on the midline (25) of the rotating piece (23) at an equal distance from the midpoint (26) of the rotating piece (23).

10. Laser-based measuring system as in claim 8, characterized in that a third sensor determines the effect of foreign radiation and daylight and all three sensors control a differential amplifier.

11. Laser-based measuring system as in claim 8, characterized in that the coordinate monitors (19 & 20) have rotating pieces (23) with sensors (24) for the measurement signal (2a) and the equipment-zero signal (2b).

12. Laser-based measuring system as in claim 1, characterized in that a base plate (30) with three setscrews (31, 32, & 33) in the form of a triangle is mounted on the measurement bed (21) with spring-loaded tensioning elements (34 & 35) on the lines of application of the tensioning triangle, which is mounted on a rail (36).

13. Laser-based measuring system as in claim 12, characterized in that the rail is a T rail (36) with a Morse-taper adaptor that can be introduced into tensioned T grooves and the T rail is tensioned in the tensioned T groove by means of spring-loaded balls (39) with their convexities penetrating the flange (40) and web (41) of the rail where they intersect.

14. Laser-based measuring system as in claim 12, characterized in that two other setscrews (37) should be mounted on the base plate (30) in contact with the rail (36) and perpendicular to the length of the rail and the first setscrews (31, 32, & 33).

15. Laser-based measuring system as in claim 1, characterized in that the calibration reference in accordance with the invention is accordingly an independent weighted wire (43) with a diameter $d \geq F/\cos \beta$, where $\beta = 10\text{-}15°$ and with liquid-damped vibration.

16. Laser-based measuring system as in claim 15, characterized in that the wire (43) is suspended from a strip (42) that can be tensioned between the floor (54) and ceiling (55) of a room.

17. Laser-based measuring system as in claim 1, characterized in that the deflector setting (18) has a point (46) of rotation that is stationary in relation to the device and constitutes the zero point for a translation along two axes (arrows D & F) and for a rotation around three axes (arrows B, C, & E).

18. Laser-based measuring system as in claim 17, characterized in that the deflector setting (18) has a shaft (47) that can be rotated (arrow D) around a point (46) of rotation in the laser-based measuring device (7) that is stationary in relation to it, in that the shaft can also be rotated (arrow C) around its own axis and displaced (arrow D) longitudinally, and in that one end (48) of the shaft has a uniaxial, gimbal-mounted (arrow E) clamp (49), which guides (arrow F) a hollow shaft (50) that has a synchronized carrier (51) for the mirror support (52) of a deflector at the end toward the device and a setscrew (53) for setting the angle of mirror inclination at the other end.

19. Laser-based measuring system as in claim 17, characterized in that the synchronized carrier (51) is a frictional coupling.

* * * * *